United States Patent [19]

Kitagawa et al.

[11] Patent Number: 4,906,479
[45] Date of Patent: Mar. 6, 1990

[54] FEEDSTUFF FOR ARTEMIA

[75] Inventors: Kiyohiro Kitagawa, Chiba; Eiji Kojima; Akira Seto, both of Kanagawa; Shuichi Sakamoto, Tokyo; Takuji Nozawa, Chiba, all of Japan

[73] Assignee: The Nisshin Oil Mills, Ltd., Tokyo, Japan

[21] Appl. No.: 193,229

[22] Filed: May 11, 1988

Related U.S. Application Data

[63] Continuation of Ser. No. 910,484, Sep. 23, 1986, abandoned.

[30] Foreign Application Priority Data

Oct. 11, 1985 [JP] Japan .................................. 60-227977
Nov. 15, 1985 [JP] Japan .................................. 60-255979

[51] Int. Cl.[4] .............................................. A23K 1/00
[52] U.S. Cl. ............................................ 426/1; 426/2; 426/59; 426/60
[58] Field of Search ........................... 426/1, 2, 59, 60

[56] References Cited

U.S. PATENT DOCUMENTS

4,400,399  8/1983  Muller ....................................... 426/1

FOREIGN PATENT DOCUMENTS

2121733  8/1972  France ...................................... 426/1
30544   10/1975  Japan ....................................... 426/1

OTHER PUBLICATIONS

Patent Abstracts of Japan, vol. 6, No. 257 (C-140) 1135, Dec. 16, 1982.
Patent Abstracts of Japan, vol. 7, No. 28 (C-149) 1173, Feb. 4, 1983.
Khraptsova et al., "Enzymic Hydrolysis of Chlorella Cells", Chem. Abst. (1981), vol. 95, Abst. No. 40836v.
Loos et al., "Composition of the Cell Wall of Chlorella Fusca", Chem. Abt. (1983), vol. 98, Abst. No. 31092j.
Watanabe et al., "Relationship Between Dietary Value of Artemia Salina and their Content of W3 Highly Unsat'd Fatty Acids", Chem. Abst. 92, Abstract No. 145483x (1980).
Dunnhill et al., "Protein Extraction & Recovery from Microbial Cells", Single Cell Protein II, MIT Press (1976), Tannenbaum et al., Editors, pp. 179–207.

*Primary Examiner*—R. B. Penland
*Attorney, Agent, or Firm*—Albert L. Jeffers; John F. Hoffman; Lawrence A. Steward

[57] ABSTRACT

A feedstuff for cultivating Artemia as a feedstuff for larvae of cultivated fishes or crustaceans is provided, which feedstuff for cultivation is a product obtained by treatment of breaking the cell wall of monocellular algae, the thus obtained Artemia having a high survival rate, the body length thereof being large and the content of eisacopentaenoic acid and docosahexaenoic acid in the total fatty acids therein being much higher than those of conventional feedstuffs.

5 Claims, 3 Drawing Sheets

FEEDSTUFF FOR ARTEMIA

This is a continuation of application Ser. No. 910,484, filed Sept. 23, 1986 now abandoned.

BACKGROUND OF THE INVENTION

1. Field of the Invention

This invention relates to a feedstuff for Artemia capable of efficiently cultivating Artemia to be used for producing fishes crustaceans larva.

2. Related Art Statement

In recent years, cultivation fishery techniques have been rapidly developed, and a considerably large part of edible fishes have come to be acquired by cultivation. In particular, in the background on which the production rate of fish larva could have been raised with a leap, there is a development of artificial feedstuffs and living feedstuffs for various fishes.

In the present status, living feedstuffs such as Brachinus salina, Artemia, Daphnia, etc. have been successively fed to fries just after hatched from eggs in accordance with the body length of fishes, but there has been found no living feedstuff having a suitable size, to be fed after Artemia (nauplius); hence planktons gathered from natural seawater have been used. However, gathering of natural planktons is liable to depend on seasons and weather to make stabilized securing thereof difficult; thus an attempt to cultivate Artemia and thereby produce Artemia (body length: 2~4 mm) larger than conventional one has been carried out.

However, as feedstuffs for cultivating Artemia, those comprising wheat flour, soybean flour, bread yeasts, rice bran or blends thereof have been prepared and used, but with any of these feedstuffs, the death rate of Artemia during the cultivation process has been very high.

SUMMARY OF THE INVENTION

The object of the present invention is to provide a feedstuff for Artemia, by the use of which the death rate of Artemia during its cultivation process is low.

The present inventors have made extensive research and as a result have found that when unicellular algae are subjected to various treatments of breaking the cell wall, the resulting feedstuffs achieve the above-mentioned object.

The present invention resides in a feedstuff for Artemia, obtained by subjecting unicellular algae to treatment of breaking the cell wall of the algae.

DETAILED DESCRIPTION OF THE INVENTION

Figure 1:
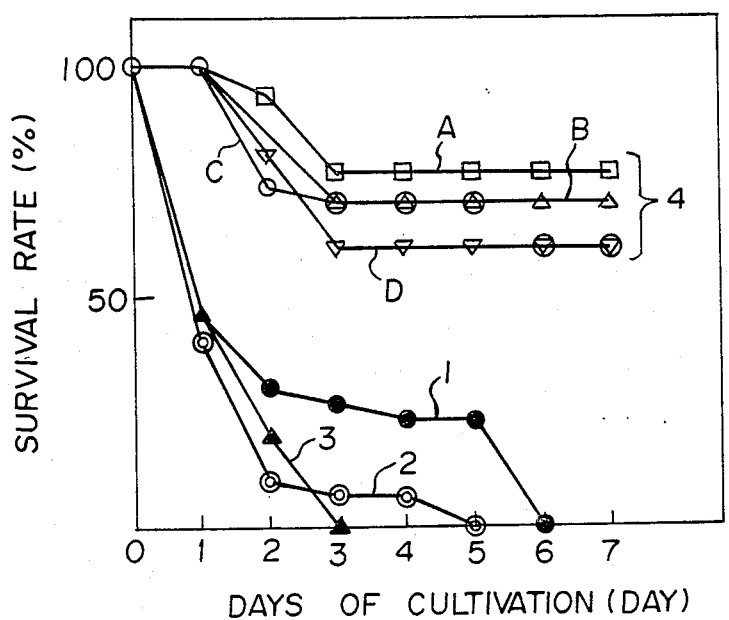
FIG. 1 shows a graph illustrating change in the survival rate of Artemia in Example 1.

Artemia referred to in the present invention means marine animal planktons represented by Artemia salina and refers to those generally used as a cultivating live feedstuff. Unicellular algae usable in the present invention are freshwater and marine unicellular algae, such as freshwater chlorellas, marine chlorellas, Euglenophyceae, Diatomeae, Tetraselmis, Cyanophyceae, etc.

Freshwater chlorellas in the present invention refer usually to those classified into *Chlorella vulgaris, Chlorella ellipsoidea, Chlorella pyrenoidosa, Chlorella parasitica, Chlorella conglomerata, Chlorella variegata, Chlorella autotrophica, Chlorella mutabilis, Chlorella nocturna, Chlorella photophila*, etc.

Marine Chlorellas usable in the present invention have no particular limitation to species and genuses, but those containing eicosapentaenoic acid (EPA) or docosahexaenoic acid (DHA) are preferred, and usually those classified into *Chlorella minutissima, Chlorella vulgaris*, etc. are used. Since fries affording Artemia are, in most case, marine fishes, the content of EPA or DHA which is a $\omega$-3 polyunsaturated fatty acid, in cultivated Artemia is an important factor for determing its nutritive value; hence marine chlorellas are preferred in the aspect of rich content of these acids.

In addition, as to the classification of marine chlorellas, there is an announcement to the effect that they belong to Nannochloropsis genus (Japanese Botany Society, 50th Assembly, Lecture Gist Collection, page 143), and those referred to *Chlorella minutissima, Chlorella vulgaris*, etc. are included therein (Bullentin of the Japanese Society of Scientific Fisheries, Vol. 44, No. 10, pp 1109–1114 (197 8), ditto, Vol. 45, No. 7, pp 883–889 (1979), ditto, Vol. 45, No. 8, pp 995–959 (1979), and Oil Chemistry, Vol. 31, No. 2, pp 77–90 (1982)).

Tetraselmis refers to those classified into tetraselmis tetraselea, etc. Diatomeae refer to those classified into Rhabdonema arcuatum, etc. Euglenophyceae refer to those classified into Euglena gracilis, etc.

As to the method for breaking the cell wall, for example, one or more kinds of spray dry treatment, ultrasonic wave treatment, milling treatment, electromagnetic wave treatment, and cell wall lytic enzyme treatment may be employed and in any of the treatments, wet cells obtained by several times washing unicellular algae in the culture solution are treated.

Spray dry is carried out using a wet cell solution adjusted so as to give a solids content of 2 to 10% preferably 3 to 5%, at a temperature of fed air of about 140° to 160° C. and at a temperature of exhausted air of about 100° to 130° C.

Ultrasonic wave treatment is carried out employing a commercially available ultrasonic wave generator, in the same solids content as above and under cooling so as to give a temperature of 60° C. or lower.

Milling treatment is carried out by mixing sea sand, glass beads or the like with the wet cell solution and milling the mixture by means of a milling apparatus such as homoblender, polytron homogenizer or the like apparatus.

As the cell wall lytic enzyme, protease (papain, made by Amano Seiyaku Company, or the like), cellulase (Onozuka cellulase R10, a tradename of product made by Yakult Yakuhin Company, Meicellase, a tradename of product made by Meiji Seika Company, or the like), hemicellulase (Macellozyme, a tradename of product made by Yakult Yakuhin Company, or the like), pectinase (Pectriase, a tradename of a product made by Seishin Seiyaku Company, or the like), etc. are usable in the form of a simple substance or in admixture thereof, but there is no particular limitation to the kind of the enzymes. Further, the enzyme treatment conditions (pH, temperature, time, etc.) vary depending on the respective enzymes; hence the conditions are chosen so as to match the optimum conditions of the respective enzymes used, as much as possible.

Further, if necessary, water is added to the unicellular algae subjected to breakage of the cell wall, followed by adding a phospholipid such as soybean lecithin, a sterol such as cholesterol, phytosterol, etc., a glycolipid or dicetyl phosphate in a quantity of 1 to 50%, preferably about 3 to 10% by weight to uniformly disperse these, whereby a more stabilized dispersion is obtained.

In the case where spray dry is employed for breaking the cell wall, it is preferred to carry out the following dispersing treatment:

Such a dried product of unicellular algae is dispersed in water so as to give a solids content of about 5 to 15% by weight, followed by treating the dispersion by means of a high pressure homogenizer (delivery pressure: 300 to 500 kg/cm$^2$), a polytron homogenizer or the like, unicellular algae having formed an agglomerate of several hundred cells prior to the treatment are forcedly dispersed into one cell or an agglomerate of several cells by the treatment; hence the cell(s) are easily eaten by Artemia.

In addition, in this case, too, it is possible in the same manner as above to add a phospholipid, a sterol or the like after breakage of the cell wall, followed by forcedly dispersing the cells according to the above-mentioned method.

The feedstuff obtained according to the present invention may be use alone or in admixture with conventional feedstuffs.

The present invention will be described in more detail by way of Examples, but it should not be construed to be limited thereto.

EXAMPLE 1

Cysts of Artemia (dried product) were hatched in natural seawater over 24 hours. Artemia nauplius just after hatching were collected and subjected to a cultivation test using a feedstuff as described below. Cells were collected from the culture solution of a freshwater chlorella (*Chlorella vulgaris*) according to centrifugal separation method, followed by three times washing the cells and subjecting to the following A, B, C or D treatment:

A: Drying and breakage of the cell wall according to spray dry.

B: The spray dried product obtained by the treatment A is mixed with water in a quantity of about 15 times the weight of the product, followed by subjecting the mixture to a high pressure homogenizer treatment (500 kg/cm$^2$) to re-disperse it.

C: Treatment is carried out by means of an ultrasonic wave cell-milling machine under cooling, intermittently for 15 minutes in total.

D: Washed cell (wet cell weight, 20 g) are mixed with sea sand (100 g), followed by subjecting the mixture to milling treatment by means of a homo-blender under cooling for 10 minutes.

Further, at the same time, as controls for comparison, ① live yeasts, ② soybean flour and ③ rice bran, each adjusted to a particle size of 50 to 200μ were used.

The body length of Artemia just after hatching was about 500μ and cultivation was initiated with 30 individuals/ml.

In addition, as to the quantity of the feedstuff fed, a sufficient quantity (i.e. a quantity to such an extent that when the feedstuff was fed each 24 hours, a certain quantity of residual feedstuff was observed at the time of feeding the feedstuff next day) was checked in advance and fed. In the case of freshwater chlorellas subjected to breakage of the cell wall, of the present invention, the quantity is about 2 ml/l/day with a solution having a concentration of $1.5 \times 10^{10}$ cells/ml.

On the other hand, the quantity is 3 ml/l/day with a 5% solution of live yeasts, and 0.4 ml/l/day with a solution having a solids content of 5% of soybean flour or rice bran.

The cultivation results of Artemia (number of cultivation days and survival rate) are shown in FIG. 1. The respective graphs in the figure illustrate the following experiments:

(Experimental section)

① . . . live yeasts
② . . . rice bran
③ . . . soybean flour
④ . . . freshwater chlorella subjected to breakage of the cell wall, of the present invention {
A  spray dry treatment
B  high pressure homogenizing treatment after A treatment
C  ultrasonic wave treatment
D  sea sand treatment
}

EXAMPLE 2

Using the Artemia nauplius hatched in the same manner as in Example 1, a cultivation test was carried out with the following feedstuffs:

④ live tetraselmis cells obtained by collecting tetraselmis cells from the culture solution thereof according to centrifugal separation method, followed by three times washing;

⑤ a product obtained by adding to the solution of live tetraselmis cells of the above ④ (concentration: $1.5 \times 10^{10}$ cells/ml), 3% by weight of papain made by Amano Seiyaku Company, 0.5% by weight of Onozuka cellulose (R10) made by Yakult Yakuhin Company and 1% by weight of hemicellulase made by Tokyo Kasei Company, followed by treatment of breakage of the cell wall at a pH of 6, at 30° C. for 2 hours; and ⑥ a product obtained by mixing with 100 parts by weight of the spray dried product obtained in Example 1, a solution of soybean lecithin (5 parts by weight) and cholesterol (5 parts by weight) dissolved in a mixed solvent of hexane with ethanol (2:1), followed by desolvating the mixture, re-dispersing the resulting material in water (1,500 parts by weight) and subjecting the dispersion to high pressure homogenizer treatment.

Figure 2:
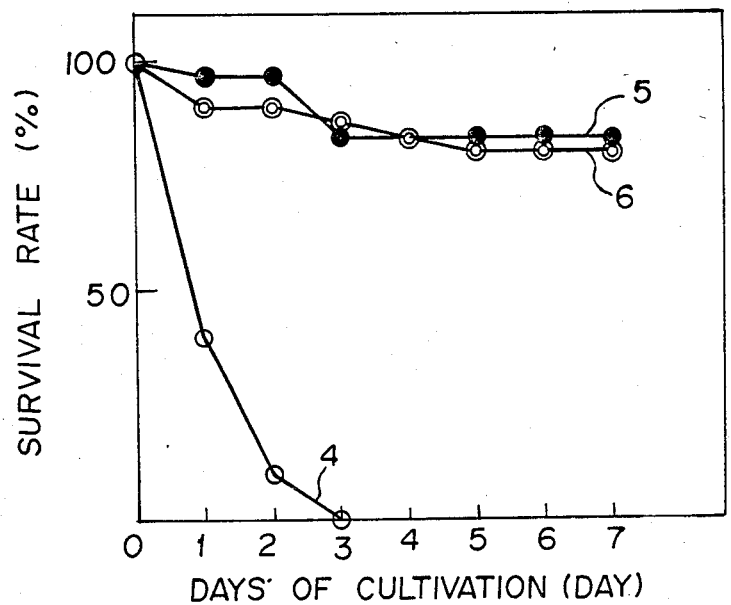
FIG. 2 shows a graph illustrating change in the survival rate of Artemia in Example 2.

In any of the cases, the quantity of feedstuff fed is 2 ml/l/day with a solution having a concentration of $1.5 \times 10^{10}$ cells/ml. The cultivation results are shown in FIG. 2.

The respective graphs illustrate the following experiments:

④ . . . live tetraselmis cells;
⑤ . . . enzyme treatment of ④; and
⑥ . . . spray treatment + soybean lecithin + cholesterol → high pressure homogenizing.

(Evaluation)

The survival rate of Artemia is high; in the case of conventional, commercially available feedstuffs, the rate has been 50% or less at the seventh day, whereas in the case of the feedstuffs of the present invention, it is about 70% or higher.

EXAMPLE 3

The Cysts of Artemia (dried product) were allowed to stand in natural seawater for 24 hours to hatch it. The Artemia nauplius just after hatching were collected and cultivation test was carried out using feedstuffs as described below. Cells of a marine chlorella were collected from the culture solution thereof according to centrifugal separation method, followed by three times washing the cells and thereafter subjecting to the following A, B, C or D treatment:

A: Drying and breakage of the cell wall are carried out according to spray dry method.

B: The spray dried product obtained in the above A is mixed with water in a quantity of about 15 times the weight of the product, followed by subjecting the mixture to high pressure homogenizer treatment (500 kg/cm$^2$) to re-disperse it.

C: Treatment is carried out employing an ultrasonic were cell-breaking machine, under cooling, intermittently for 15 minutes in total.

D: Washed cells (wet cell weight, 20 g) are mixed with sea sand (100 g), followed by subjecting the mixture to milling treatment by means of a homoblender under cooling for 10 minutes.

Further, at the same time, as controls, ① live yeasts. ② soybean flour, ③ rice bran (in any of these cases, the particle size was adjusted to 50 to 200μ) and ④ a commercially available, fine particle feed stuff ("Marine Mate", a basal feedstuff for egg fish culture made by Nihon Nosan Company; diameter, 200~300μ) were used.

The body length of Artemia just after hatched was 500μ and cultivation was initiated with about 30 individuals/ml.

In addition, as to the quantity of the feedstuff fed, a sufficient quantity (i.e. a quantity to such an extent that when the feedstuff was fed each 24 hours, a certain quantity of residual feedstuff was observed at the time of feeding the feedstuff next day) was checked in advance and fed. In the case of marine chlorellas subjected to breakage of the cell wall, of the present invention, the quantity is about 2 ml/l/day with a solution having a concentration of $1.5 \times 10^{10}$ cells/ml.

On the other hand, the quantity is 3 ml/l/day with a 5% solution of live yeasts, and 0.4 ml/l/day with a solution of 5% solids content of a commercially available, fine particle feedstuff, soybean flour and rice bran.

Figure 3:
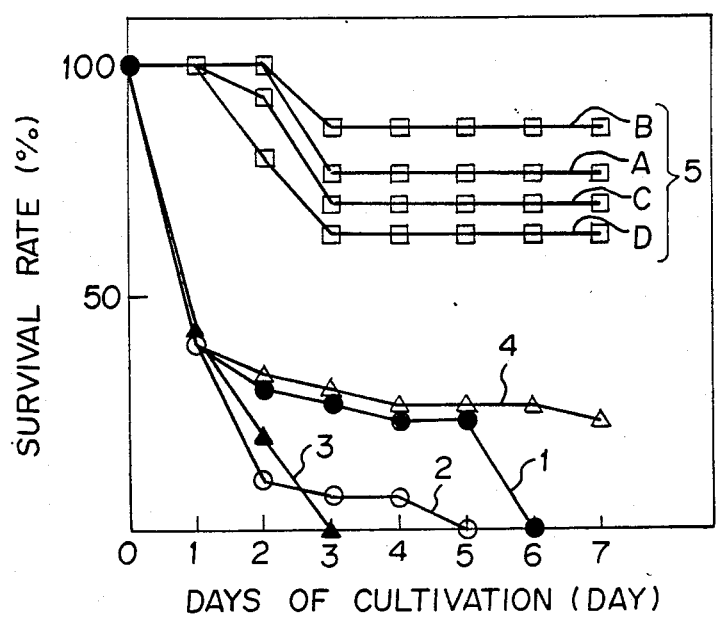
FIGS. 3 and 4 show a graph illustrating change in the survival rate and that in the body length of Artemia.
Figure 4:
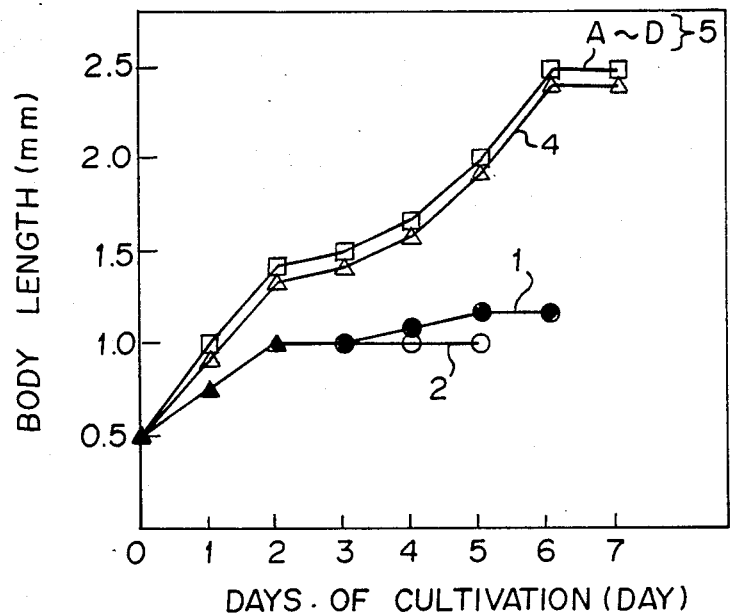

The cultivation results of Artemia are shown in FIGS. 3 and 4. The respective graphs in the figures illustrate the following experiments:

(Experimental section)

① ... live yeasts
② ... rice bran
③ ... soybean flour
④ ... commercially available, fine particle feedstuff
⑤ ... marine chlorella subjected to breakage of the cell wall, of the present invention A spray dry treatment
B A is subjected to high pressure homogenizing treatment
C ultrasonic wave treatment
D sea sand treatment Further, the contents of EPA plus DHA in the total fatty acids of the cultivated Artemia are shown in Table 1.

TABLE 1

| Feedstuff | Content of EPA + DHA (%) | Observed day |
|---|---|---|
| Just after hatched | 8.7 | — |
| ① Live yeasts | 6.3 | at the fifth day of cultivation (died after sixth day) |
| ② Soybean flour | 5.8 | at the second day of cultivation (died at the third day) |
| ③ B: Marine chlorella subjected to high pressure homogenation after spray dry | 24.9 | at the seventh day of cultivation |

EXAMPLE 4

Using the larvas of Artemia hatched in the same manner as in Example 3, larva tests were carried out with the following feedstuffs:

⑥ Live chlorella cells obtained by collecting cells from the culture solution of a marine chlorella according to centrifugal separation method, followed by three times washing;

⑦ a product obtained by adding to the solution of the live chlorella cells of ⑥ (concentration: $1.5 \times 10^{10}$ cells/ml), 3% by weight of papain made by Amano Seiyaku Company, 0.5% by weight of Onozuka cellulase (R10) made by Yakult Yakuhin Company and 1% by weight of hemicellulase made by Tokyo Kasei Company, followed by subjecting the mixture to treatment of breaking the cell wall at a pH of 6, at 30° C. for 2 hours; and ⑧ a product obtained by mixing with 100 parts by weight of a spray dried product obtained in Example, a solution of soybean lecithin (5 parts by weight) and cholesterol (5 parts by weight) dissolved in a mixed solvent (20 parts by weight) of hexane with ethanol (2:1), followed by desolvating the mixture, thereafter re-dispersing the resulting material in water (150 parts by weight) and subjecting the dispersion to high pressure homogenizer treatment.

Figure 5:
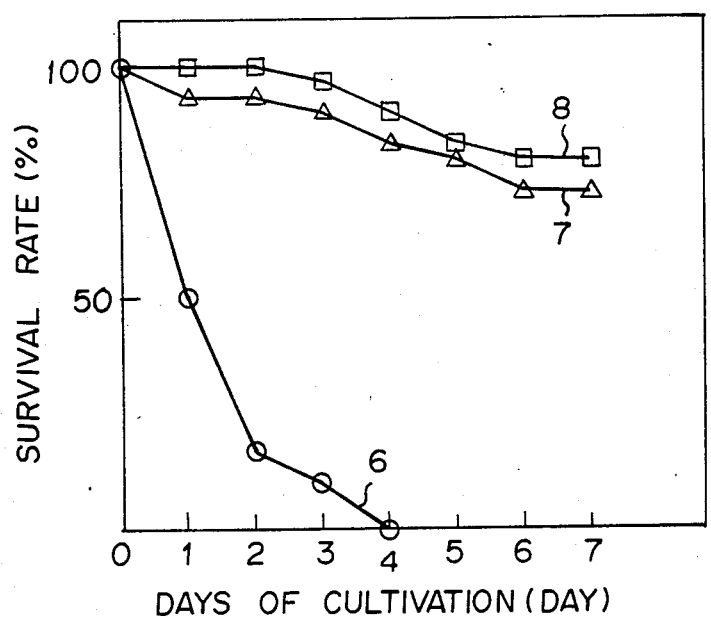
FIGS. 5 and 6 show a graph illustrating change in the survival rate and that in the body length of Artemia in Example 4, respectively.
Figure 6:
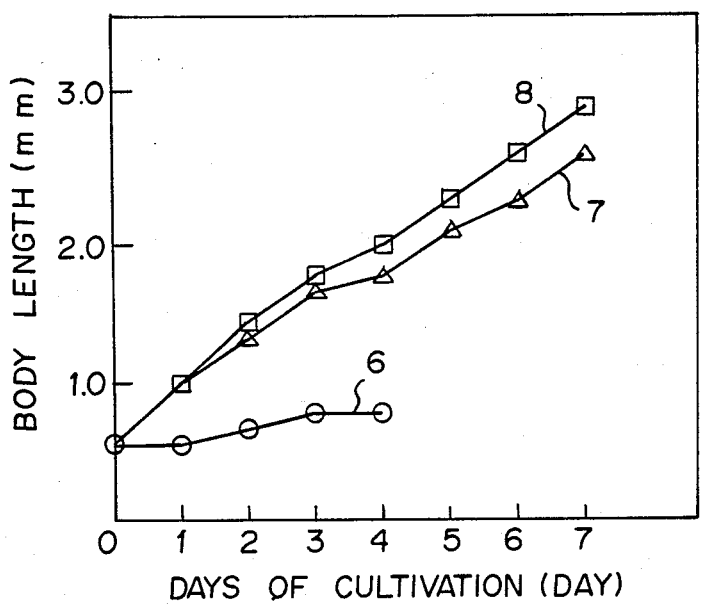

In any of the cases, the quantity of feedstuff fed is 2 ml/l/day with a solution having a concentration of $1.5 \times 10^{10}$ cells/ml. The cultivation results are shown in FIGS. 5 and 6. The respective graphs in the figures illustrate the following experiments:

⑥ ... live chlorella cells;
⑦ ... the cells of ⑥ were subjected to enzyme treatment; and
⑧ ... spray dry treatment + soybean lecithin + cholesterol → high pressure homogenizing.

Further, as to the contents of EPA + DHA in the total fatty acids of the cultivated Artemia, the values at the seventh day of those according to the feedstuffs were 25.1% and 28.3%, respectively.

(Evaluation)

(1) According to the feedstuff of the present invention, the survival rate of Artemia is high, that is, in the case of conventional, commercially available feedstuffs, the rate has been 50% or lower at the seventh day, whereas in the case of the feedstuff of the present invention, the rate amounts to about 70% or higher.

(2) According to the feedstuff of the present invention, Artemia having a body length of about 2.5~3 mm is easily obtained.

(3) The content of EPA plus DHA in the total fatty acids has been 3 to 12% in the case of conventional feedstuffs, whereas in the case of the feedstuff of the present invention, the content amounts to 25 to 30%.

We claim:

1. A process for cultivating Artemia which comprises collecting *Artemia nauplius* after hatching and cultivating the Artemia by using unicellular algae having its cell wall disrupted as a feedstuff, said cell wall being disrupted by at least one of spray dry treatment, ultrasonic wave treatment, milling treatment, electromagnetic wave treatment or cell wall lytic enzyme treatment, said unicellular algae being selected from the group consisting of freshwater Chlorellas, marine Chlorellas, Euglenophyceae, Diatomeae, Tetraselmis and Cyanophyceae.

2. The process of claim 1 wherein said unicellular algae are marine Chlorellas.

3. The process of claim 2 wherein said marine Chlorella is selected from the group consisting of *Chlorella minutissima, Chlorella vulgaris* and mixtures thereof.

4. The process of claim 1 wherein the cell wall of unicellular algae is disrupted by spray dry treatment and water is added to the resulting dried product which is, then, forcedly dispersed in the form of one cell or an agglomerate of several cells by means of a homogenizer.

5. The process of claim 1 wherein a dispersed mixture of said unicellular algae having its cell wall disrupted and at least one selected from the group consisting of phospholipids, sterols, glycolipids and dicetyl phosphate is used as the feedstuff.

* * * * *